United States Patent [19]

Shih

[11] Patent Number: 4,727,370
[45] Date of Patent: Feb. 23, 1988

[54] METHOD AND SYSTEM FOR SYNCHRONOUS HANDSHAKE GENERATION

[75] Inventor: Lionel C. Shih, San Jose, Calif.

[73] Assignee: Ampex Corporation, Redwood City, Calif.

[21] Appl. No.: 809,699

[22] Filed: Dec. 17, 1985

[51] Int. Cl.[4] .............................................. H04Q 9/00
[52] U.S. Cl. ................................ 340/825.1; 375/106; 375/109; 340/825.14; 340/825.07
[58] Field of Search ............. 340/825.1, 825.14, 825.5, 340/825.07, 825.21, 825.63; 371/61, 33; 370/103; 375/8, 62, 106, 109

[56] References Cited

U.S. PATENT DOCUMENTS

| | | | |
|---|---|---|---|
| 3,866,172 | 2/1975 | Caron | 375/109 |
| 3,982,061 | 9/1976 | Dorey | 178/2 R |
| 4,314,109 | 2/1982 | Sekiguchi et al. | 370/103 |
| 4,390,967 | 6/1983 | Eglowstein et al. | 340/825.21 |
| 4,451,886 | 5/1984 | Guest et al. | 340/825.07 |
| 4,475,191 | 10/1984 | James et al. | 375/106 |
| 4,486,750 | 12/1984 | Aoki et al. | 340/825.14 |

Primary Examiner—Donald J. Yusko
Attorney, Agent, or Firm—Elizabeth E. Strnad; Joel D. Talcott

[57] ABSTRACT

A method and system are provided for generating a synchronized handshake between communicating parts of a digital system operating from a common clock. A request signal is sent from an initiating station to a responding station. The responding station acknowledges receipt of the request by sending an acknowledge signal back to the initiating station, thereby completing a so-called handshake. In accordance with the invention both the request and acknowledge signal are pulses of a fixed duration greater than one but less than two clock cycles. A new request signal may be transmitted concurrently with the reception of an acknowledge signal, resulting in a maximum handshake rate of one half of the common clock rate.

22 Claims, 8 Drawing Figures

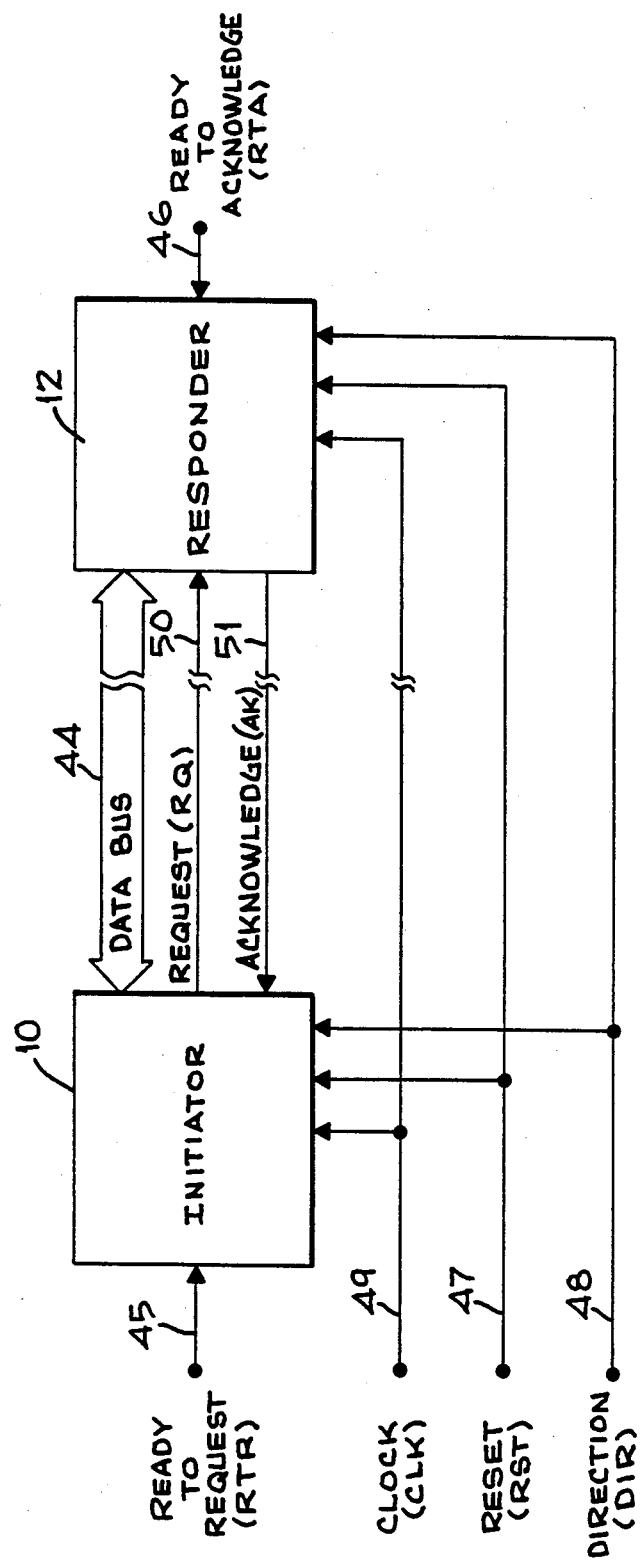
FIG_1

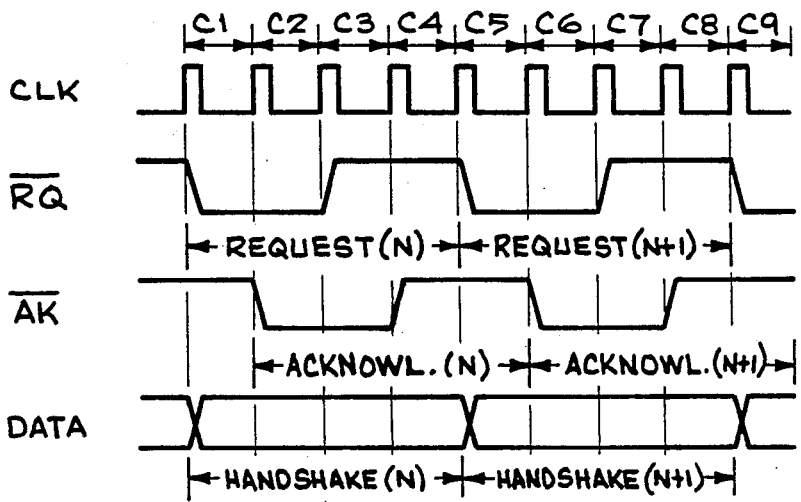
FIG_2A
(PRIOR ART)
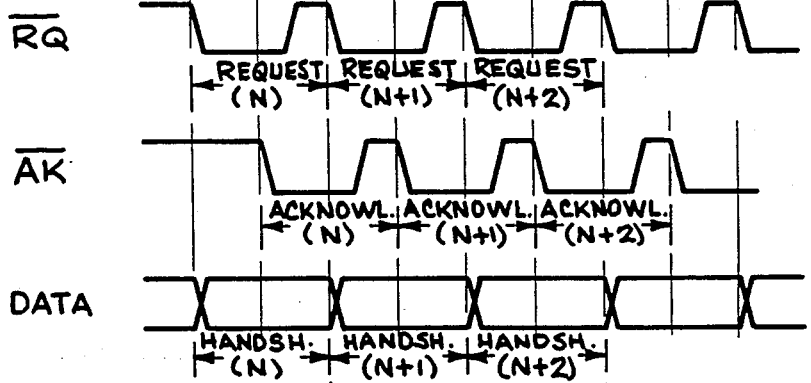
FIG_2B
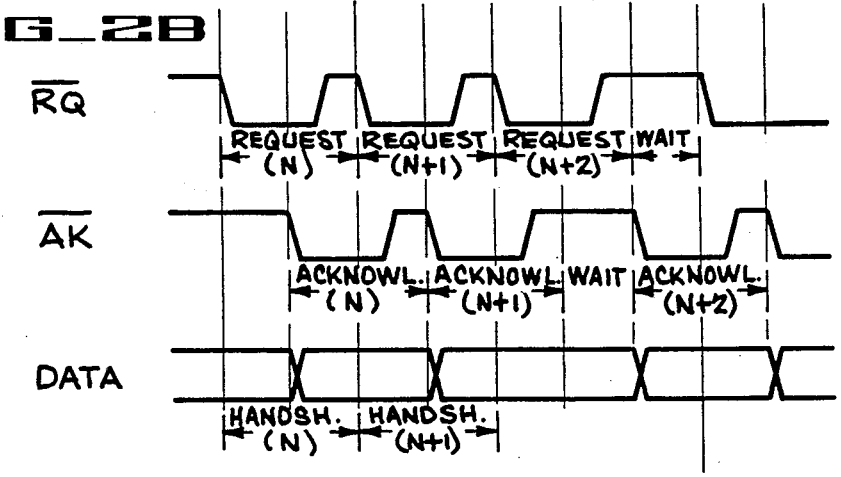
FIG_2C

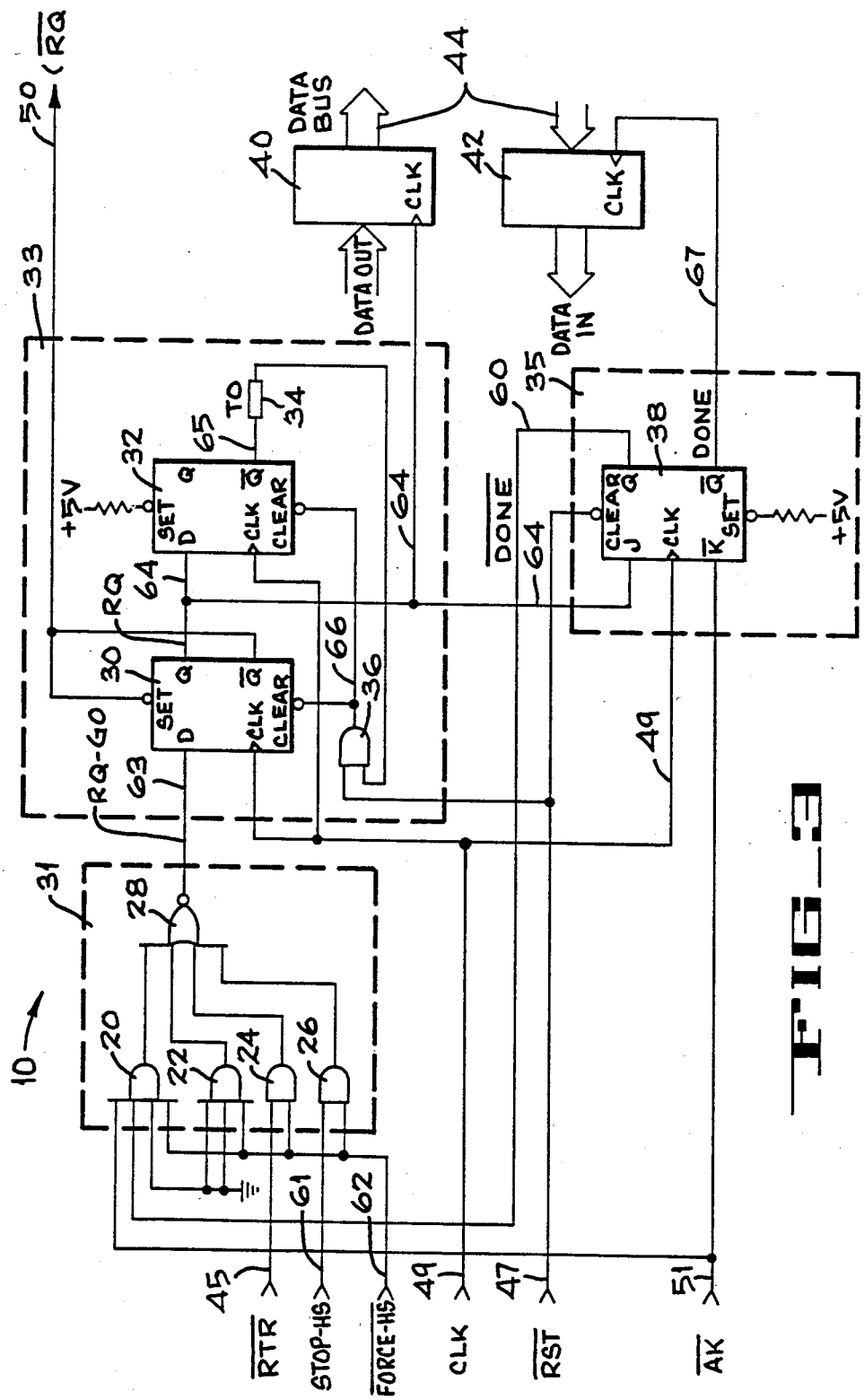

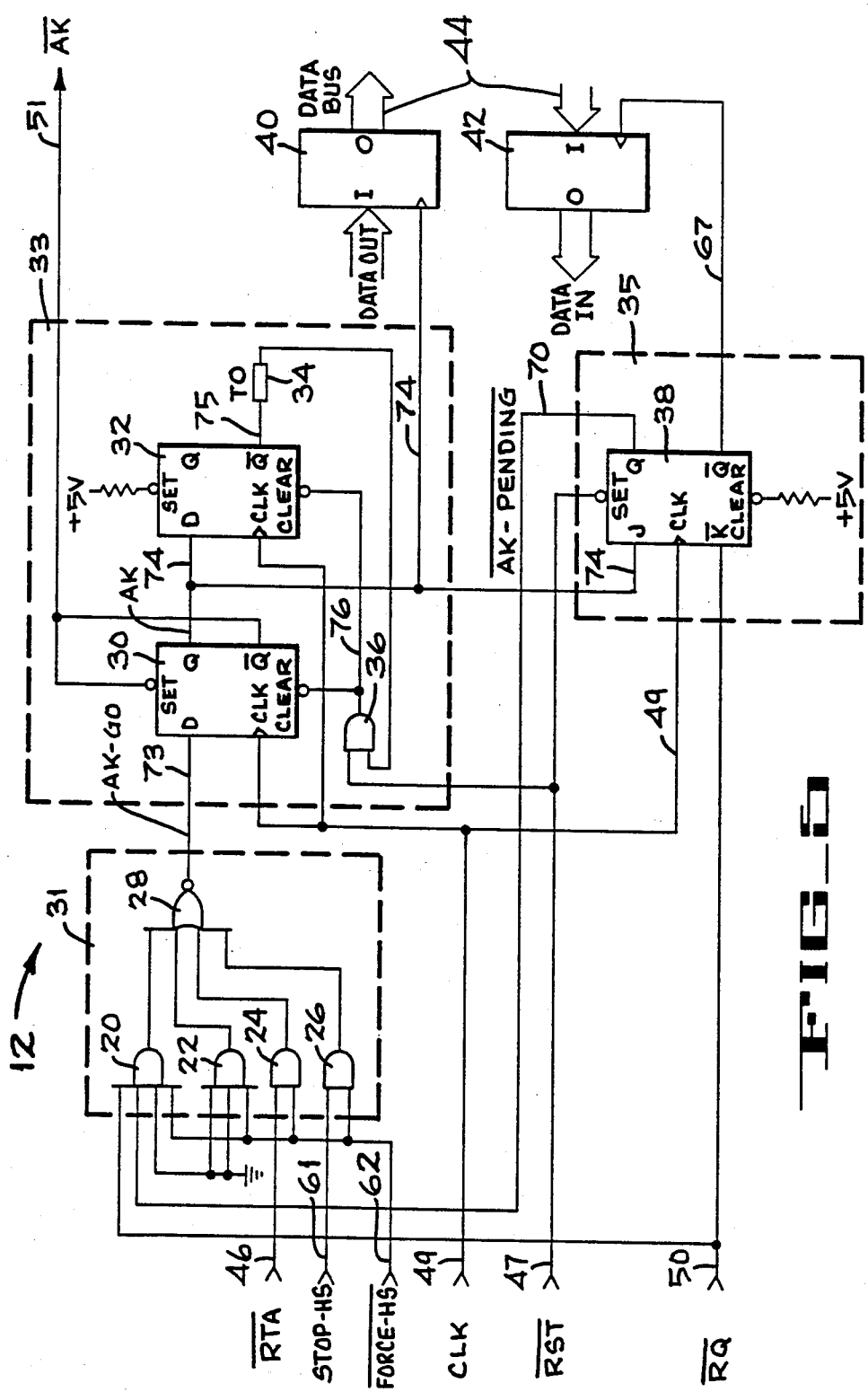
FIG_5

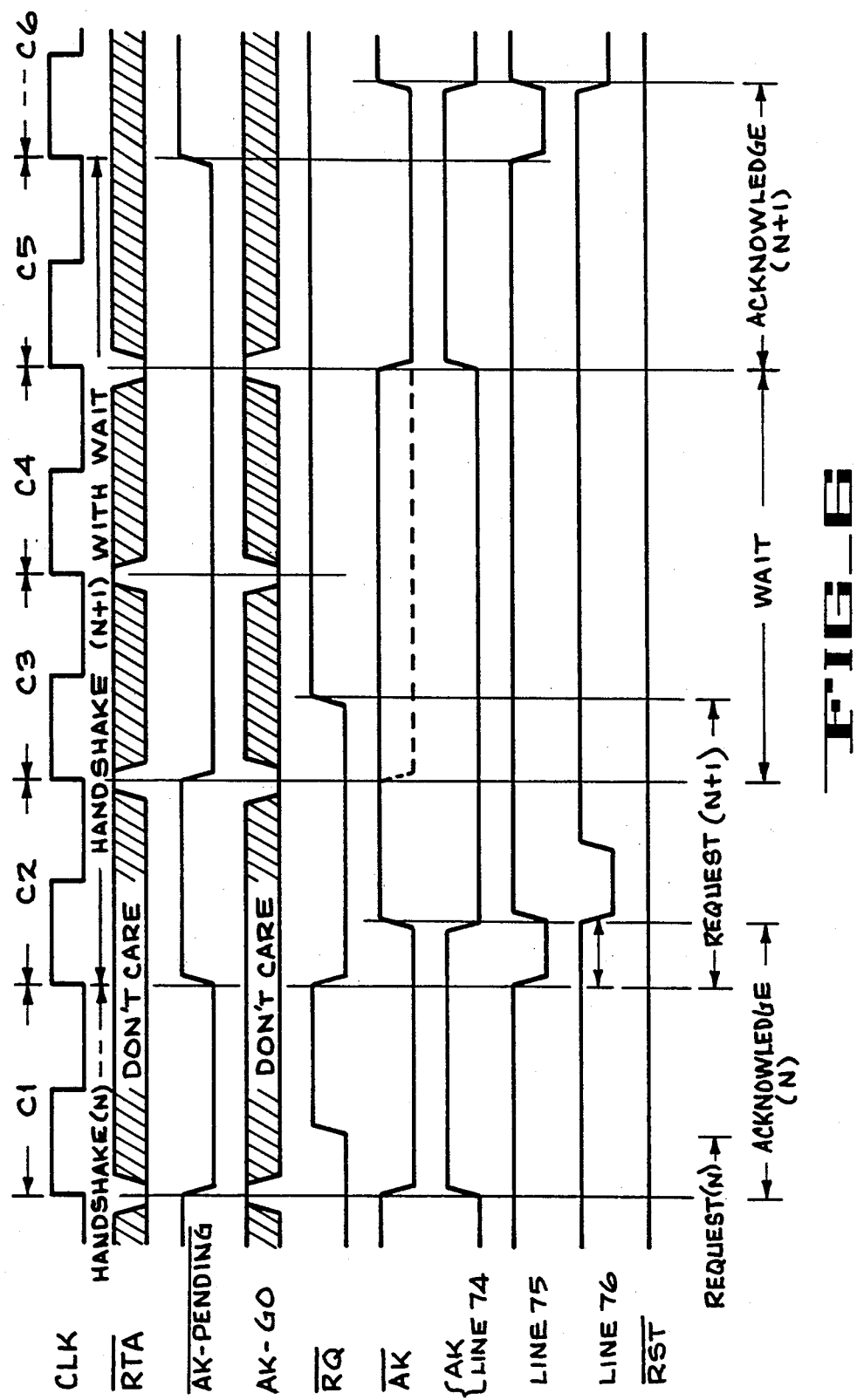
FIG_6

METHOD AND SYSTEM FOR SYNCHRONOUS HANDSHAKE GENERATION

The present invention relates to digital systems and, more particularly, to a novel method and system for performing a handshake routine between communicating parts of a digital system in a manner which increases data transmission rate for a given system clock frequency.

Digital systems are known to exchange two way control signals between various system portions when performing a particular task. For example, before transmitting data from one location to another within the same system, or between interconnected systems, a data requesting control signal may be sent from an initiator to a responder. In a system utilizing a two way data exchange, the initiator may be either a data sending or data receiving unit, while the responder may be a data receiving or sending unit, respectively. The responder upon reception of the request signal acknowledges the receipt by sending an acknowledgement control signal to the initiator. The above-described exchange of control signals is generally referred to as a "handshake" routine, or shortly "handshake".

Digital data transmission systems employ both synchronous and asynchronous techniques to transmit data from one point in a system to another or between interconnected systems. Where synchronous data transmission is used, the sending and receiving units typically operate from a common system clock, or separate clocks synchronized in time and repetition rate.

In the past, such handshake routines required a minimum of four clock cycles to resolve a complete handshake cycle measured from the beginning of a request to the reception of a corresponding acknowledge signal, when a new request signal may be initiated. Therefore, the maximum allowable handshake rate heretofore has been one quarter of the system clock frequency.

It will be appreciated that increasing the maximum allowable handshake rate accelerates the overall interaction between the communicating system portions. Thus, a higher handshake rate will increase the overall data transmission or exchange rate. Because the handshake rate itself is a function of the number of clock pulses per handshake cycle, the handshake rate can be increased for a given clock frequency by reducing the number of clock pulses required to resolve a handshake cycle. In a given environment, where the clock rate is dictated by the circuitry and the physical characteristics of the transmission having a given propagation delay, reduction of the number of necessary clock pulses per handshake cycle results in achieving higher data transmission rates.

BRIEF SUMMARY OF THE INVENTION

The present invention provides a novel method and system for generating a synchronized handshake routine with substantially increased repetition rate relative to a system clock rate. In particular, the present invention provides a synchronized overlapped handshake routine which can be completed in just two clock cycles as opposed to four clock cycles required by known handshake techniques. When utilizing the handshake of the invention for example for synchronous data transmission, the transmission rate is doubled over that achievable by known systems.

Briefly, in accordance with the invention, a request signal is transmitted from an initiating station, shortly initiator to a responding station, shortly responder, when the initiator is ready to either send or receive information and at the occurrence of a first clock pulse. The request signal has a fixed duration of more than one and less than two clock cycles. When the request signal is received by the responder, and at the occurrence of a second clock pulse, subsequent to the first clock pulse, an acknowledge signal is transmitted from the responder to the initiator. The acknowledge signal has a fixed duration of more than one and less than two clock cycles.

It is a particular advantage of the present invention that a new request signal can be transmitted simultaneously with the reception of an acknowledge signal responding to a previous request. The request and acknowledge signals can be thereby exchanged during just two consecutive clock pulses and a new request may be initiated upon the occurrence of every other clock pulse, that is every two clock cycles, when no wait state occurs. The obtainable response rate is thus twice as high as in the known systems. For example, when transmitting data through a two-way channel between the initiating and responding stations, the data exchange rate is doubled.

BRIEF DESCRIPTION OF THE DRAWINGS

The foregoing and other novel features and advantages of the present invention will become more apparent from the following detailed description of a preferred embodiment when read in conjunction with the appended drawings in which:

FIG. 1 is a functional block diagram of a data transmission system using a synchronized handshake;

FIG. 2A is a signal diagram illustrating the general timing of a prior art synchronized handshake technique;

FIGS. 2B and 2C are signal diagrams illustrating the timing of a synchronized handshake technique according to the present invention;

FIG. 3 is a circuit diagram illustrating a preferred embodiment of a logic circuit for generating a request signal in accordance with the present invention;

FIG. 5 is a circuit diagram illustrating a preferred embodiment of a logic circuit for generating an acknowledge signal in accordance with the present invention; and, FIG. 6 is a signal diagram illustrating the relative timing of various signals in the circuit of FIG. 5.

DETAILED DESCRIPTION

Figure 4:
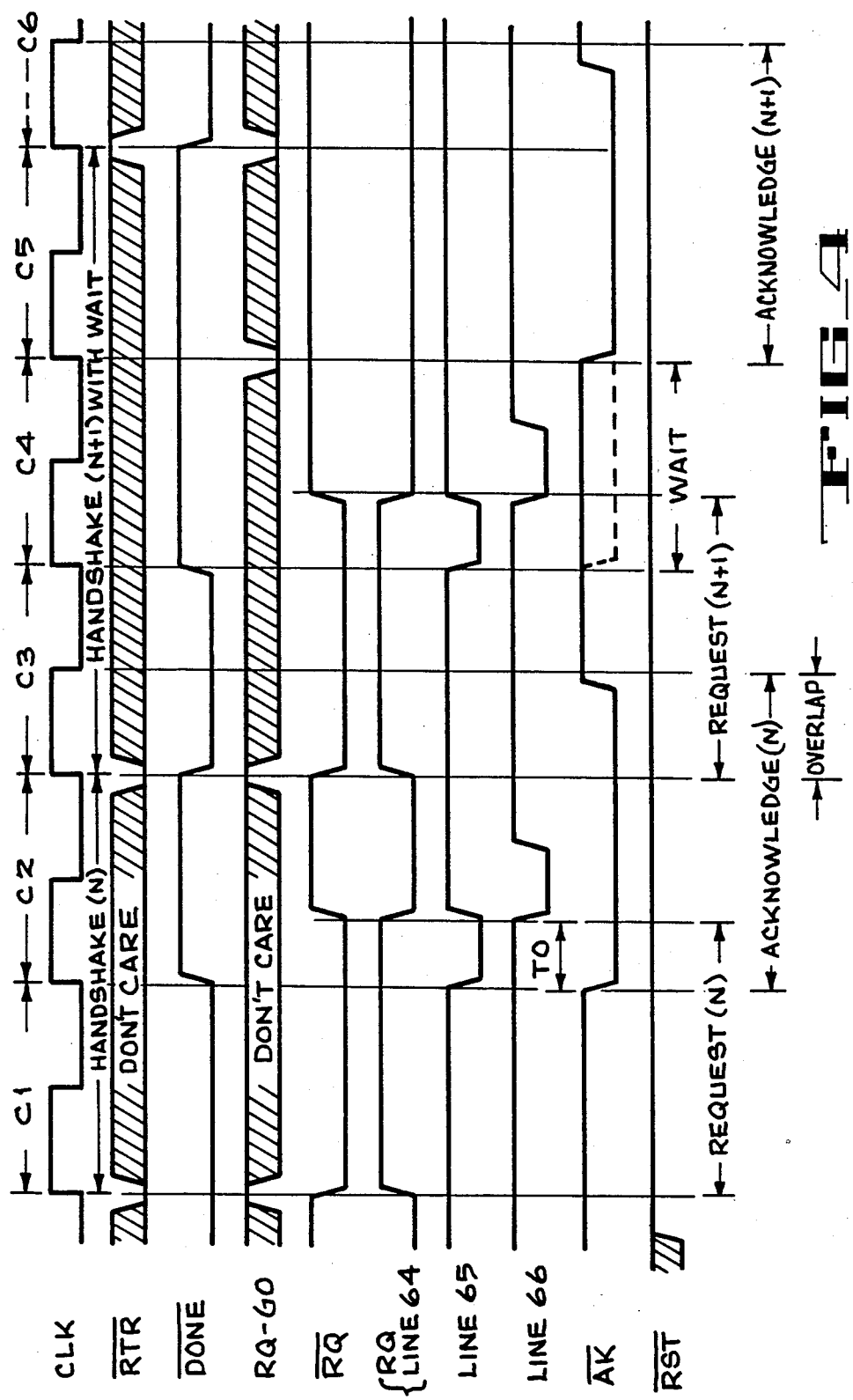
FIG. 4 is a signal diagram illustrating the relative timing of various signals in the circuit of FIG. 3.

The present invention may be useful in a variety of data transmission applications in which the sending and receiving stations engage in a synchronized handshake routine. It is contemplated, for example, that the invention may be used to maximize the data exchange rate between system components through a large interconnection panel in a digital system, or to maximize the data exchange rate between two separate systems operating from a common clock. The description hereinafter relates to a preferred embodiment utilized in the former application wherein two system components communicate over a system data bus.

Throughout the attached drawing figures like circuit elements or portions are designated by like reference numerals to facilitate comparison.

FIG. 1 functionally illustrates the typical arrangement for data transmission on a data bus 44 between two components of a digital system. A system controller (not shown) conventionally provides control signals including a ready to request (RTR) signal on line 45, ready to acknowledge (RTA) signal on line 46, reset (RST) signal on line 47 and direction (DIR) signal on line 48, to control the data flow among the various system components. A clock (CLK) signal is provided on line 49 by the system clock (not shown) which operates continuously to provide a train of clock pulses at a predetermined system clock rate in a well known manner.

Two parts of a digital system arranged in a data exchange configuration are shown in FIG. 1. For the purpose of clarity in describing the present invention, those parts are identified as an initiating station or initiator 10 and a responding station or responder 12. The initiator 10 may be any part or component of the digital system which initiates an information exchange, that is requests either sending or receiving information over the data bus 44 to or from another part or component of the system. Similarly, the responder 12 may be any part or component of the system which responds to the initiator's request for information exchange by acknowledging receipt of such request and by either sending or receiving information over the data bus 44. The direction of the information exchange is controlled by the DIR signal on line 48.

The initiator 10 receives the RTR, CLK, RST, and DIR system control signals and is connected to the data bus 44. The responder 12 receives the RTA, CLK, RST, and DIR system control signals and likewise is connected to the data bus 44 as illustrated in FIG. 1. A request signal RQ is supplied via line 50 by the initiator 10 to the responder 12, and an acknowledge signal AK is supplied via line 51 from the responder 12 to the initiator 10.

In operation, the initiator 10 and responder 12 are conditioned to exchange data by the ready signals RTR and RTA. A request signal RQ commencing a handshake cycle is transmitted via line 50 from the initiator to the responder upon the occurrence of a first clock pulse of the clock signal CLK, and the responder returns via line 51 an acknowledge signal upon the receipt of the RQ signal and at the occurrence of the next succeeding clock pulse of the clock signal CLK. As will be seen hereinafter, data may be placed on the data bus 44 during the handshake cycle defined by the request and acknowledge signals RQ and AK and the clock signal CLK.

The timing of a known synchronized handshake, including the relative timing of the clock signal, the request and acknowledge signals, and the data exchange, are illustrated in FIG. 2A. Timing diagrams of the above-named signals obtained in accordance with the invention are shown in FIGS. 2B and 2C. Subsequent cycles of the request and acknowledge signals are designated (N), (N+1), (N+2), etc.

It is noted that in the preferred embodiment of the invention clock edges corresponding to positive going clock signal transitions are utilized as the clock reference.

With reference to FIG. 2A, a request signal $\overline{RQ}$ is initiated by the initiating station 10 upon occurrence of a positive going edge of a first clock pulse C1. The request signal $\overline{RQ}$ assumes a predetermined signal level indicative of a request, for example a binary ZERO. In accordance with conventional logic signal designations, those signals which assume an active low or "zero" state are herein designated by a bar, for example $\overline{RQ}$, to distinguish from active high or "one" state. The $\overline{RQ}$ signal remains at that assumed level for two complete clock cycles until the third successive clock pulse C3 of the clock signal CLK returns it to the non-request level, for example a binary ONE.

An acknowledge signal $\overline{AK}$ is generated upon receipt by the responding station 12 of the request signal at the next successive clock pulse C2 occuring after the request generating first pulse C1 assuming there is no waiting period. The acknowledge signal $\overline{AK}$ assumes its acknowledge level, for example a binary ZERO, until the fourth successive pulse C4 of the clock signal returns it to the non-acknowledge level, for example a binary ONE. Data may be placed on the data bus for a period of four clock cycles during the request/acknowledge handshake cycle. It can be seen that the handshake cycle in FIG. 2A encompasses the period of four clock cycles and a new request cannot be initiated until the end of the fourth clock cycle, that is from the beginning of C1 to the beginning of C5.

Because the clock rate is generally a predetermined function of the system design, it will be appreciated that by using the handshake technique of the present invention the data transmission rate is significantly enhanced for a particular system clock rate. The manner in which this is accomplished is described hereinafter in connection with the system diagram of FIG. 1 and the waveforms of FIGS. 2B and 2C.

FIG. 2B illustrates an example of a timing diagram indicating data transmission from an initiator 10 to a responder 12 in accordance with the present invention. Upon the occurrence of a first pulse C1 of the clock signal CLK after the initiator 10 has been conditioned by the RTR signal to transmit data, the initiator 10 generates a request signal $\overline{RQ}$ and applies it to the responder 12. The request signal in accordance with the invention is a pulse of fixed duration which assumes a predetermined active signal level, for example a binary ZERO level at one edge of the clock pulse, for example the leading edge, and resumes its non-active signal level, for example a binary ONE level a fixed time thereafter. In accordance with the invention, the request signal has a duration of greater than one clock cycle but less than two clock cycles. In the timing diagram of FIG. 2B, therefore, the request signal $\overline{RQ}$ is present, that is, it is in its active request state upon occurrence of the pulse C2 of the clock signal immediately following the pulse C1 which generates the request signal, and is absent, that is, in its non-request state upon occurrence of the next clock pulse C3.

With continued reference to FIGS. 1 and 2B, the responder 12 receives the request signal $\overline{RQ}$ on line 50 and generates the acknowledge signal $\overline{AK}$ upon occurrence of the next pulse C2 of the clock signal CLK immediately following the first clock pulse C1 if the RTA signal on line 46 is present, that is, in its active state. The acknowledge signal $\overline{AK}$ is a pulse of fixed duration which changes from a non-active signal level, for example a binary ONE, to an active signal level, for example a binary ZERO at a predetermined edge, for example the leading edge of the clock pulse and returns to its non-active signal level a fixed time thereafter. Like the request signal, the duration of the acknowledge signal is greater than one clock cycle but less than two clock cycles.

When a direction of information flow designated by the DIR signal on line 48 is from the initiator 10 to the responder 12, data may be placed on the data bus 44 during the request signal cycle by the initiator as illustrated in FIG. 2B. For reversed direction of information flow, data may be placed on the data bus 44 by the responder 12 during the acknowledge signal cycle, as shown in FIG. 2C. Also illustrated in FIG. 2C is the timing of the request, acknowledge, and data signals in the event that there is a wait period between the request and the corresponding acknowledge signals.

A wait period may be initiated by either the RTR or RTA signal on line 45 or 46 by the system controller rendering these control signals in a non-active state. As a result, generation of a next subsequent request or acknowledge signal will be postponed until the corresponding control signal RTR or RTA returns to its active state and at the occurrence of the next clock signal.

It will be appreciated that in accordance with the present invention a complete request/acknowledge handshake cycle and the exchange of data can occur over the course of two clock cycles. Since the request signal duration is greater than one clock cycle it can be detected by the responder upon occurrence of the clock pulse C2 immediately following the clock pulse C1 which initiated the request. Concurrently with the detection, the responder 12 may transmit a corresponding acknowledge signal. Since the request signal is less than two clock cycles in duration, a new request may be initiated at the end of every two clock cycles. Similarly, the duration of the acknowledge signal assures its detection at C3 and allows it to repeat every two clock cycles. Therefore, one handshake cycle and data exchange can be completed in the span of two clock cycles, and the obtainable handshake rate as well as data rate are twice that of the known technique illustrated in FIG. 2A for the same system clock rate.

FIGS. 3 and 5 illustrate preferred embodiments of the respective circuits for initiating and acknowledging requests for data exchange. FIGS. 4 and 6 are timing diagrams of various signals in the circuits of FIGS. 3 and 5, respectively. It should be noted that the cross-hatched areas of the signal waveforms indicate that the logic level in those areas is unimportant and thus is labeled "DON'T CARE."

The circuit 10 of FIG. 3 for initiating a request, or shortly initiating station, may be divided into three sections. The first section 31 determines whether a request signal RQ should be generated. If an RQ signal is to be generated, the second section 33 will provide proper timing for the RQ signal. The third section 35 monitors the handshake status.

Section 31 is preferably implemented by combinational logic comprising AND gates 20, 22, 24 and 26, and a NOR gate 28, as contained in a commercially available 74F64 integrated circuit package. Section 33 of the preferred embodiment has two D flip-flops 30 and 32, type 74F74, a conventional delay line 34 and an AND gate 36. Section 35 has a JK̄ flip flop 38, type 74F109.

Now examples of the operation of circuit 10 of FIG. 3 will be described with reference to the timing diagram of FIG. 4.

Section 31 receives the ready to request signal $\overline{RTR}$ on line 45, the acknowledge signal $\overline{AK}$ on line 51 and a $\overline{DONE}$ signal on line 60 from the JK̄ flip-flop 38. The $\overline{DONE}$ signal is generated by the flip-flop 38 when a handshake cycle is completed, as it will be described in more detail below. Test command signals STOP-HS and $\overline{FORCE\text{-}HS}$ may also be supplied via lines 61 and 62 to section 31 from the system controller for testing purposes. The STOP-HS signal, when in an active high state, completely inhibits generation of request signals. The $\overline{FORCE\text{-}HS}$ signal is active in its low state, it overrides the STOP-HS signal and forces generation of a request signal regardless of the status of any other control signal.

The status of the above-described input signals is examined by the section 31 and a request enabling signal RQ-GO is provided on output line 63 therefrom in the following situations.

First, if the previous handshake is completed and both the $\overline{DONE}$ signal from flip-flop 38 and the ready to request signal $\overline{RTR}$ are in their active low states, a normal handshake is initiated. The second situation is that of an overlapped handshake when both the $\overline{RTR}$ signal and the acknowledge signal $\overline{AK}$ are in their active low states, regardless of the state of the $\overline{DONE}$ signal. The third situation involves testing by the system controller. If the forced handshake signal $\overline{FORCE\text{-}HS}$ on line 62 is in its active low state, the request go signal RQ-GO on line 63 assumes its active high condition. The STOP-HS signal on line 61 causes the RQ-GO signal to go low and thus inhibits generation of a request signal $\overline{RQ}$ by the section 33. The forced handshake signal $\overline{FORCE\text{-}HS}$ overrides the STOP-HS signal, as previously indicated.

The second section 33 of the initiator circuit generates the request signal $\overline{RQ}$ on line 50 with the proper timing and duration. Both flip-flops 30 and 32 are clocked by the same positive going edge of the clock pulses CLK. The Q output of the first flip-flop 30 is connected to the D input of the second flip-flop 32 via line 64. At the first clock rising edge after the RQ-GO signal on line 63 goes to its active high state, flip-flop 30 is set and its Q output on line 64 goes high. Its complementary output Q̄ goes low and thus provides an active low $\overline{RQ}$ output signal on line 50.

The Q output signal from the flip-flop 30 also is connected to the set input terminal thereof. This arrangement assures that the flip-flop 30 will not change state at the rising edge of the clock pulse immediately following the pulse which sets it. Therefore, the request signal $\overline{RQ}$ will be greater than one clock cycle in duration.

The second rising edge of the clock signal CLK after the RQ-GO signal goes high will set the flip-flop 32 causing its Q output to assume a high signal level and its Q̄ output connected to line 65 to go low. Because of the presence of a non-active high reset signal $\overline{RST}$ on line 47, after a short delay To of less than one clock cycle, for example one half of a clock cycle introduced by the delay line 34, the Q̄ output signal from the flip-flop 32 will clear via AND gate 36 and line 66 both flip-flops 30 and 32 to their reset condition in which the Q output signals are low and the Q̄ output signals are high, thus completing one request signal cycle $\overline{RQ}$. Thus, it will be appreciated that the request signal is of a predetermined fixed duration of more than one but less than two clock cycles.

It is seen from the timing diagram of FIG. 4 that the delayed signal line 66 which resets the flip-flops 30 and 32 is not synchronous with a clock edge but instead, its timing is set by the amount of delay To provided by the delay line 34. Because the transition of a particular request signal $\overline{RQ(N)}$ from a low active state back to a high non-active state occurs between two consecutive clock edges, the clock edge following that transition may be utilized for generation of a subsequent request signal $\overline{RQ}$ (N+1) if an acknowledge signal $\overline{AK}$ (N) in response to the request signal $\overline{RQ}$(N) has been generated. That subsequent request signal $\overline{RQ}$(N+1) overlaps in time with the acknowledge signal $\overline{AK}$(N) thereby overlapping handshakes (N) and (N+1) as it is seen in the example of FIG. 4.

The third section 35 of the initiator comprising the J$\overline{K}$ flip-flop 38 is continuously clocked by the clock signal CLK at the rising edge of each clock pulse. It receives the request signal RQ on line 64 at its J input terminal and the acknowledge signal $\overline{AK}$ at its $\overline{K}$ input and it monitors the handshake status. Each generated request signal $\overline{RQ}$ on line 50 causes the Q output terminal of flip-flop 38 go high, that is to assume the "not done" state on line 60, until a responding acknowledge signal $\overline{AK}$ is received. When an active low $\overline{AK}$ signal is received on line 51, the flip-flop 38 is reset. Its Q output terminal goes low, and the $\overline{DONE}$ signal on line 60 assumes its active low or "done" state indicating that a handshake cycle has been completed. The flip-flop 38 also may be reset to the "done" state by the reset signal $\overline{RST}$ on line 47.

A truth table depicting the above-described operation of the flip-flop 38 of FIG. 3 is shown in TAB. 1:

TABLE 1

| $\overline{RQ}$ line 50 | $\overline{AK}(\overline{K})$ line 51 | RQ(J) line 64 | (Q) line 60 | Handshake States | Comments |
|---|---|---|---|---|---|
| Low | Low | High | — | — | Never happens |
| Low | High | High | High | Not done | Generated an $\overline{RQ}$ |
| High | Low | Low | Low | Done | Received an AK |
| High | High | Low | Q | Idling | Nothing happened |

With further reference to FIG. 4, a normal handshake cycle is shown during clock cycles C1 and C2 from the beginning of request (N) to the beginning of request (N+1). During that cycle and acknowledge (N) in response to the request (N) starts at clock C2 and it overlaps a next consecutive request (N+1) during the first half of clock cycle C3.

In absence of a wait condition, an acknowledge (N+1) would normally start at the positive going edge of clock C4. However, when a wait condition occurs, as it is for example shown at C4, the $\overline{AK}$ signal remains in its non-active high state past the next clock edge C5. Consequently, the RQ-GO signal is low at clock C5, indicating that the $\overline{AK}$ signal on line 51 has not been received by the he circuit of FIG. 3. When thereafter an $\overline{AK}$ signal is received at the next clock C6, a next request (N+2) could be normally generated. However, the Ready to request signal $\overline{RTR}$ at clock C6 is in its non-active high state and therefore the RQ-GO signal is also in its non-active low state. Consequently, a subsequent request signal RQ cannot be generated until the $\overline{RTR}$ signal returns to its active low level.

It will be appreciated that the data to be exchanged may be placed on the data bus and accepted from the data bus 44 in a variety of ways in response to the signals available in the initiator 10 logic. For example, as is illustrated in FIG. 3, conventional data transmit and data receive registers 40 and 42 may be coupled to both the initiating station 10 and the data bus 44. Data to be transmitted from the initiator station 10 may be applied to the data transmit register 40 and clocked into that register by the request signal RQ on line 64 from the Q output terminal of the flip-flop 30. Thereafter, that data may be applied from register 40 to the data bus 44.

Similarly, the DONE signal from the $\overline{Q}$ output terminal of flip-flop 38 may be used to clock data from the data bus into the data receive register 42 so that data is available from the output of the register for further processing.

A preferred embodiment of the logic circuitry of the responder 12 for acknowledging a request is illustrated in FIG. 5. FIG. 6 shows timing of various signals in the circuit of FIG. 5. It is seen from a comparison of FIGS. 3 and 5 that the circuit elements implementing the initiating and the responding stations 10 and 12 are similar. As previously mentioned, like reference numerals are used in FIGS. 3 and 5 to designate like components. To avoid repetition, only those portions of the circuit of FIG. 5 will be described which differ from FIG. 3.

In the responder circuit 12 of FIG. 5, section 31 determines whether conditions necessary for generating an acknowledge signal $\overline{AK}$ on line 51 are met. Section 33 provides proper timing for the $\overline{AK}$ signal. Section 35 comprising flip-flop 38 monitors whether there is a pending acknowledgement signal.

FIG. 6 generally illustrates the logic levels and timing relationships of the various signals applied to and produced by the circuit of FIG. 5.

With further reference to FIGS. 5 and 6, section 31 of the responder circuit 12 receives a ready to acknowledge signal $\overline{RTA}$ on line 46. A request signal $\overline{RQ}$, for example from the initiator 10 shown in FIG. 3 is received on line 50. The output signal on line 51 from the Q terminal of flip-flop 30 in FIG. 5 is an acknowledge signal $\overline{AK}$, generated by the responder 12.

The reset signal $\overline{RST}$ on line 47 is connected to the set terminal of flip-flop 38 rather than to its clear terminal, as it has been the case in FIG. 3. The output signal from the Q terminal of flip-flop 38 on line 70 of FIG. 5 is an $\overline{AK}$-PENDING signal. It is in its active low state when an acknowledgement signal $\overline{AK}$ is pending. The flip-flop 38 is initialized by the $\overline{RST}$ signal to obtain a non-active high state of the $\overline{AK\text{-PENDING}}$ signal on line 70, indicating that generation of an acknowledge signal $\overline{AK}$ by the circuit of FIG. 5 is not pending. When an $\overline{RQ}$ signal on line 50 is received, the $\overline{AK\text{-PENDING}}$ signal on line 70 will be in its active low pending state. In case an $\overline{AK}$ signal is pending, a next succeeding request signal $\overline{RQ}$ cannot be generated until flip-flop 38 is reset by the AK signal on line 74 and the $\overline{AK\text{-PENDING}}$ signal on line 70 becomes active low.

FIG. 6 shows a wait condition as being introduced at clock C3 in response to a "not ready" high status of the ready to acknowledge signal $\overline{RTA}$. Consequently, the AK-GO signal is at its non-active low state and an acknowledge (N+1) in response to request (N+1) cannot be generated at clock C3. At the next consecutive clock C4 the $\overline{RTA}$ signal is again high, AK-GO is low and therefore $\overline{AK}$ cannot be generated. At the following consecutive clock C5 the $\overline{RTA}$ signal is active low, the AK-GO signal is active high and a $\overline{AK}$ signal (N+1) corresponding to the request (N+1) is generated. It is seen from FIG. 6 that the acknowledge (N+1) has been delayed by two clock cycles C3 and C4 due to the wait condition.

Thus a delayed acknowledge signal $\overline{AK}$ is generated on line 51 by the circuit of FIG. 6 when the $\overline{RTA}$ signal applied to the gate 24 is active low and there is an acknowledgement pending, that is the J-$\overline{K}$ flip flop 38 is reset and the $\overline{ACK\text{-PENDING}}$ signal on line 70 is active low. The signal $\overline{AK}$ is generated for an immediate acknowledgement that is without delay when if the RTA signal is active low and the request signal $\overline{RQ}$ is at its active low state. As with the initiator, the circuit test mode is operative when the $\overline{FORCE-HS}$ signal is at its active low state forcing the generation of the acknowledgement signal $\overline{AK}$.

The truth table depicting the operation of the flip-flop 38 of FIG. 5 is shown in TAB. 2 below:

TABLE 2

| RQ(K) line 50 | AK line 51 | AK(J) line 74 | (Q) line 70 | Handshake States | Comments |
|---|---|---|---|---|---|
| Low | Low | High | — | — | Never happens |
| Low | High | Low | Low | Pending | Received an RQ |
| High | Low | High | High | Not Pending | Generated an AK |
| High | High | Low | Q | Pending Idling | Nothing happened |

The principles, preferred embodiments and modes of operation of the present invention have been described in the foregoing specification. The invention which is intended to be protected herein, however, is not to be construed as limited to the particular embodiments disclosed, since these are to be regarded as illustrative rather than restrictive. Moreover, variations and changes may be made by those skilled in the art without departing from the scope of the present invention.

What is claimed is:

1. A method for providing a synchronized handshake between communicating parts of a digital system having a common clock signal, comprising the steps of:
   transmitting a request signal from an initiating station in response to a first clock pulse of said common clock, said request signal having a duration of more than one clock cycle and less then two clock cycles;
   receiving the request signal at a responding station and detecting one of a ready and not-ready status of a ready-to-acknowledge control signal; and
   transmitting an acknowledge signal having a duration of more than one clock cycle and less than two clock cycles from said receiving station to said initiating station in response to a second clock pulse of the common clock and a ready status of said ready-to-acknowledge control signal.

2. The method of claim 1 wherein said first and second clock pulse are consecutive pulses of the common clock.

3. The method of claim 1, further comprising the step of:
   detecting at the initiating station one of a pending and a completed handshake status; and
   providing a first control signal inhibiting transmission of a subsequent request signal in response to a pending handshake status and enabling generation of a subsequent request signal in response to a completed handshake status.

4. The method of claim 3 wherein said subsequent request signal is transmitted in response to a third clock pulse of the common clock.

5. The method of claim 4 wherein said first, second and third clock pulse are consecutive pulses of the common clock.

6. The method of claim 1 further comprising the step of introducing a wait condition into said initiating station for delaying transmission of a subsequent request signal.

7. The method of claim 1 further comprising the step of introducing a wait condition into said responding station for delaying transmission of said acknowledge signal in response to said received request signal and a detected not-ready status of said ready-to-acknowledge control signal, and wherein said first and second clock pulse are non-consecutive pulses of said common clock.

8. The method of claim 7 further comprising the steps of:
   detecting at the responding station one of a pending and a generated acknowledge signal status in response to said received request signal; and
   providing a second control signal enabling generation of an acknowledge signal in response to said received request signal when a pending acknowledge signal status is detected and upon termination of said wait condition.

9. A method for providing synchronized handshake between a request signal initiating station and a responding station of a digital system, said stations operatiing from a common clock, comprising the steps of:
   transmitting a first request signal from said initiating station at the occurence of a first clock pulse of said common clock;
   receiving said first request signal by said responding station, detecting a ready status of a ready-to-acknowledge control signal, and transmitting an acknowledge signal to said initiating station at the occurence of a second clock pulse of said common clock;
   receiving said acknowledge signal at said initiating station, detecting a ready status of a ready-to-request control signal, and transmitting a consecutive second request signal from said initiating station at the occurrence of a third clock pulse of said common clock; and
   wherein said first and second request signal and said acknowledge signal have a duration of more than one clock cycle and less than two clock cycles and wherein said first, second and third clock pulse are consecutive clock pulses of said common clock.

10. An apparatus for providing synchronized handshake between a request signal initiating station and a responding station of a digital system, said stations operating from a common clock, comprising:
   first means coupled to transmit a first request signal from said initiating station at the occurrence of a first clock pulses of said common clock;
   second means coupled to receive said first request signal at said responding station, detect a status of a ready-to-acknowledge control signal, and in response to a not-ready status introduce a wait period at said responding station for delaying transmission of an acknowledge signal to said initiating station at the occurrence of a second clock pulse of said common clock;
   wherein said first and second request signal and said acknowledge signal have a duration of more than one clock cycle and less than two clock cycles and wherein said first and second clock pulse are non-consecutive clock pulses of said common clock.

11. The apparatus of claim 10 wherein said first means is coupled to receive a wait control signal for delaying transmission of a consecutive second request signal at the occurrence of a third clock pulse and wherein said second and third clock pulse are non-consecutive clock pulses of said common clock.

12. Apparatus for providing a synchronized handshake between communicating parts of a digital system having a common clock signal, comprising:
- an initiating station coupled to transmit a request signal in response to a first pulse of the common clock, said request signal having a duration of more than one clock cycle and less than two clock cycles; and
- a responding station coupled to receive said request signal, to detect one of a ready and not-ready status of a ready-to-acknowledge control signal and to transmit to said initiating station an acknowledge signal in response to a second pulse of the common clock, and a ready status of said ready-to-acknowledge control signal, said acknowledge signal having a duration of more than one clock cycle and less than two clock cycles.

13. The apparatus of claim 12 wherein said first and second clock pulse are consecutive pulses of the common clock.

14. The apparatus of claim 12 wherein said initiating station comprises:
- a first circuit coupled to detect one of a pending and a completed handshake status, and to provide responsively a first control signal; and
- a second circuit coupled to receive said first control signal and to inhibit transmission of a subsequent request signal in response to a pending handshake status and to enable transmission of a subsequent request signal in response to a completed handshake status.

15. The apparatus of claim 14 wherein said subsequent request signal is transmitted in response to a third clock pulse of the common clock.

16. The apparatus of claim 13 wherein said first, second and third clock pulse are consecutive pulses of said common clock.

17. The apparatus of claim 14 wherein said second circuit is coupled to receive a wait control signal for delaying generation of a subsequent request signal.

18. The apparatus of claim 12 wherein said responding station is coupled to receive a wait control signal for delaying transmission of said acknowledge signal in response to said received request signal and a not-ready status of said ready-to-acknowlege control signal and wherein said first and second clock pulse are non-consecutive pulses of said common clock.

19. The apparatus of claim 18 wherein said responding station comprises:
- a third circuit coupled to detect one of a pending and a generated acknowledge signal status in response to said received request signal, and to provide responsively a second control signal; and
- a fourth circuit coupled to receive said second control signal and to enable generation of an acknowledge signal in response to a pending acknowledge signal status and termination of said wait signal.

20. An apparatus for providing synchronized handshake between a request signal initiating station and a responding station of a digital system, said stations operating from a common clock, comprising:
- first means coupled to transmit a first request signla from said initiating station at the occurence of a first clock pulse of said common clock;
- second means coupled to receive said first request signal at said responding station, to detect a status of a ready-to-acknowledge control signal, and transmit an acknowledge signal to said initiating station at the occurrrence of a second clock pulse of said common clock and in response to a ready status of said read-to-acknowledge control signal;
- said first means coupled to receive said acknowlege signal and transmit a consecutive second request signal at the occurence of a third clock pulse of said common clock; and
- wherein said first and second request signal and said acknowlege signal have a duration of more than one clock cycle and less than two clock cycles and wherein said first, second and third clock pulses are consecutive clock pulses of said common clock.

21. A method for providing synchronized handshake between a request signal initiating station and a responding station of a digital system, said stations operating from a common clock, comprising the steps of:
- transmitting a first request signal from said initiating station at the occurrence of a first clock pulse of said common clock;
- receiving said first request signal by said responding station;
- detecting a not-ready status of a ready-to-acknowledge control signal, and in response thereto introducing a wait period at said responding station for delaying transmission of an acknowledge signal to said initiating station;
- detecting a ready state of said ready-to-acknowledge control signal and transmitting an acknowledge signal to said initiating station at the occurrence of a second clock pulse of said common clock;
- receiving said acknowledge signal at said initiating station and transmitting a consecutive second request signal from said initiating station at the occurrence of a third clock pulse of said common clock; and
- wherein said first and second request signal and said acknowledge signal have a duration of more than one clock cycle and less than two clock cycles and wherein said first, second and third clock pulse are non-conseutive clock pulses of said common clock.

22. The method of claim 21, further comprising a step of detecting one of a ready and not-ready status of a ready-to-request control signal, and delaying said step of transmitting said consecutive second request signal in response to a detected not-ready status of said ready-to-request control signal.

* * * * *